INVENTORS
HARRY A. MEYER
HENRY J. LANGLOIS
BY SMITH, OLSEN, LEWIS & McRAE
ATTORNEYS

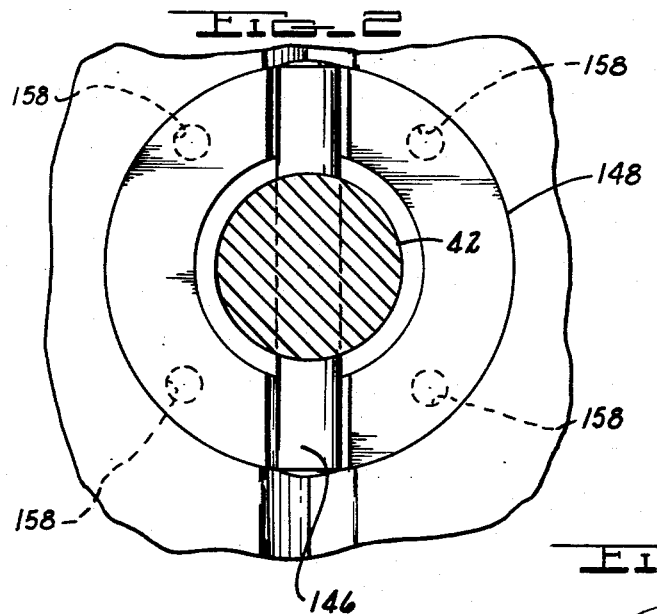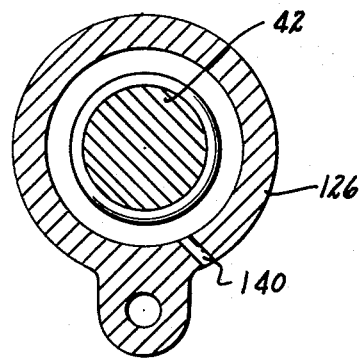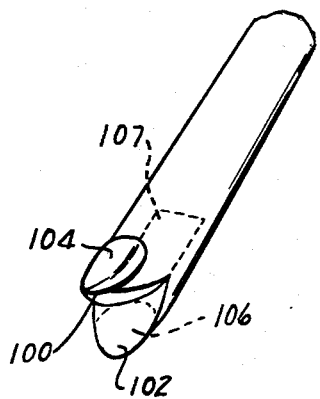

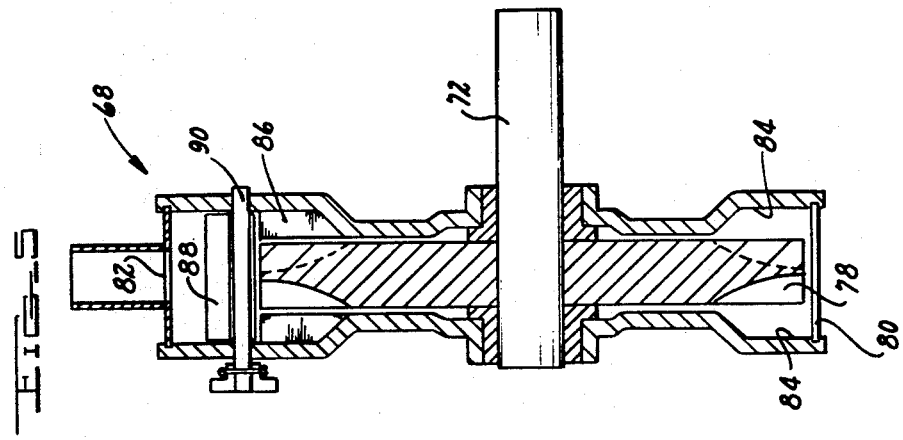
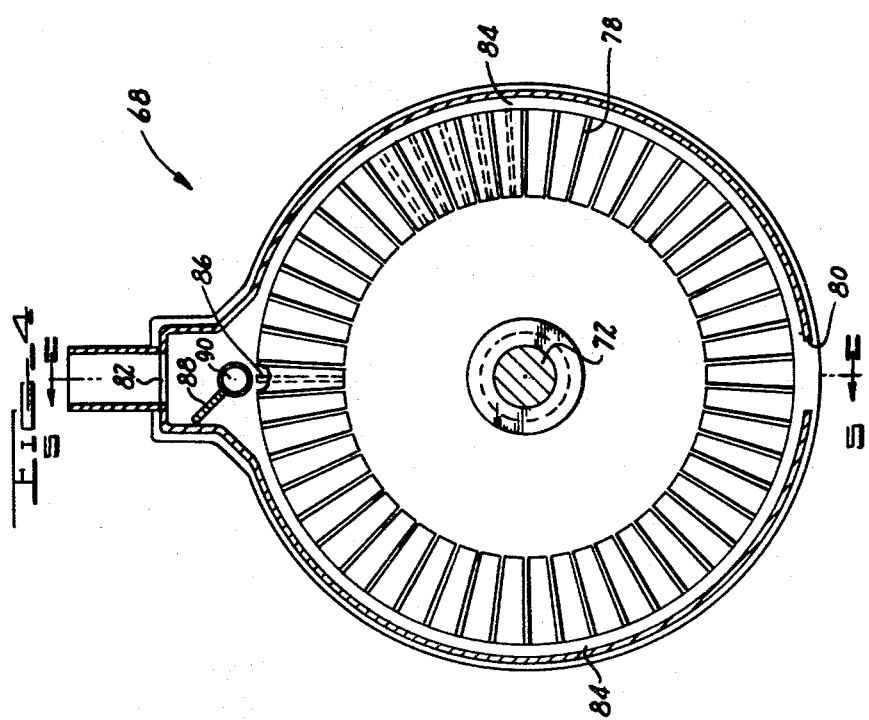

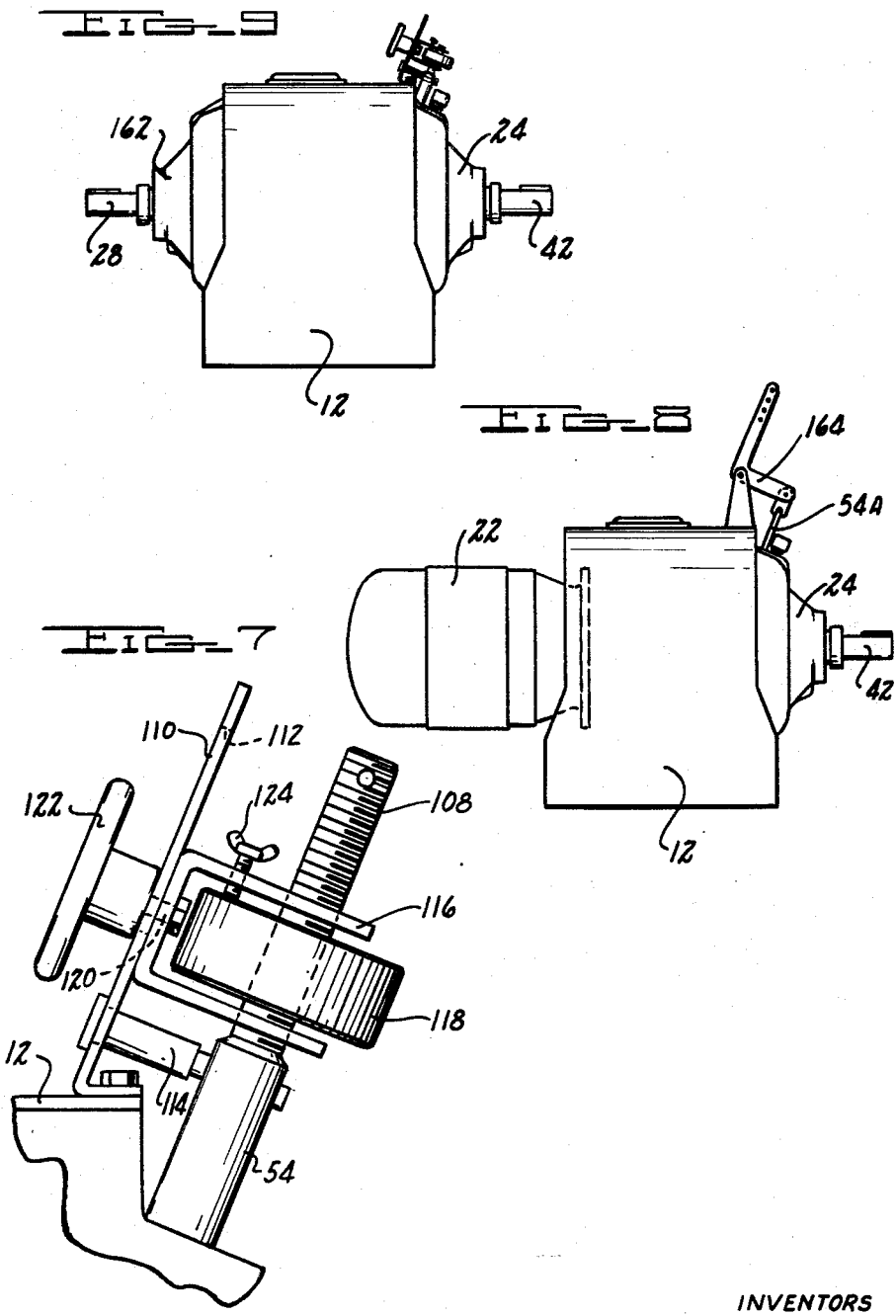

United States Patent Office 3,190,076
Patented June 22, 1965

3,190,076
FLUID DRIVE FOR REVERSIBLE ROTATION
Harry A. Meyer, Detroit, and Henry J. Langlois, Dearborn, Mich., assignors to American Radiator & Standard Sanitary Corporation, New York, N.Y., a corporation of Delaware
Filed Apr. 23, 1962, Ser. No. 191,670
3 Claims. (Cl. 60—54)

This is a continuation-in-part of application Serial Number 612,994, filed October 1, 1956 (now abandoned).

The present invention relates to a fluid torque transmitter or coupling, and in particular to various improvements in units of this character.

It is an object of the present invention to provide a fluid torque transmitter that can be operated in either direction of rotation without any change in components so that finished units can be kept in stock by the manufacturer for immediate delivery without the trouble and expense of changing the design to conform to the rotational requirements, said torque transmitter being adapted to be instantaneously and continuously reversed from one rotation to the other without shutdown, thereby opening the way to many new applications for variable speed dual-rotation units.

It is another object of the present invention to provide an improved torque transmitter utilizing a scoop tube assembly for speed regulation, which transmitter has high load starting characteristics due to the unique arrangement within the scoop chamber of fill vanes for pumping working fluid to the work chamber, an appropriate deflector plate and the absence of any inner casing, and by virtue of such inherent high torque capacity it being possible to maintain a constant output speed in the face of varying loads and varying input speeds, simply by adjustment of an automatic speed control lever.

It is still another object of the present invention to provide a fluid torque transmitter having an impeller and a runner forming a fluid work chamber, wherein the impeller and runner lineup is not critical due to a unique design of independent suspension of each rotor half whereby each rotor is isolated from the other except for the working fluid.

It is still another object of the present invention to provide a fluid torque transmitter having independent suspension for each rotor wherein a housing is the connection between the shafts for said rotors whereby a complete electrical insulation of the one half relative to the other can be obtained merely by making the stationary housing of an insulating or dielectric material.

It is another object of the present invention to provide a fluid torque transmitter having independent suspension of the foregoing character wherein the bearing supports for the input and output shafts are carried in end bells adapted to be attached to said housing, and wherein unique lubricating means for the bearings are provided, and further to provide a mounting means for the input end bell so that the latter can be interchanged with an electric motor mounting thereby enabling the torque transmitter to be selectively driven either by such electric motor or by a belt drive when using the input end bell.

Still another object of the present invention is to provide a fluid torque transmitter utilizing a scoop tube assembly for speed regulation wherein the mounting for the scoop tube assembly is such that the scoop tube can be inserted into the scoop chamber anywhere through 360 degrees about the axis of such scoop chamber thereby obtaining the optimum scoop tube position for easy adaptability to any type of control.

It is still another object of the present invention to provide a reversible fluid torque transmitter utilizing a scoop tube assembly for speed regulation wherein a manual control means is provided enabling quick changes to be made in the setting of the scoop tube and in addition a vernier setting permits accurate settings to be made.

Still another object of the present invention is to provide a reversible fluid torque transmitter having an improved circuit for the working fluid wherein a reversible pump is located within a working fluid reservoir and below the normal level of the working fluid thereby eliminating a priming problem and assuring that the pump will not become air bound.

It is still another object of the present invention to provide a reversible fluid torque transmitter having a reversible pump of the foregoing character, wherein said pump is driven from the input shaft of the torque transmitter by a chain drive, the chain thereof passing into the working fluid to be constantly lubricated thereby during operation of the torque transmitter.

Other objects of this invention will appear in the following description and appended claims, reference being had to the accompanying drawings forming a part of this specification wherein like reference characters designate corresponding parts in the several views.

In the drawings:

FIGURE 2 is a fragmentary enlarged section taken on the line 2—2 of FIGURE 1;

FIGURE 3 is an enlarged section taken on the line 3—3 of FIGURE 1;

FIGURE 4 is an elevation through the fluid pump with one side plate removed;

FIGURE 5 is a section taken on the line 5—5 of FIGURE 4;

FIGURE 6 is an enlarged fragmentary view showing the end of the dual scoop tube;

FIGURE 7 is an enlarged fragmentary view of the manual control for the scoop tube as used with the embodiment of FIGURE 1;

FIGURE 8 is a reduced side elevation of the embodiment of FIGURE 1, but wherein a portion of an automatic control for the scoop tube is employed;

FIGURE 9 is a side elevation of another embodiment wherein end bells are used at both ends of the unit, and the latter is driven from a belt drive, flexible coupling, or the like;

Figure 1:
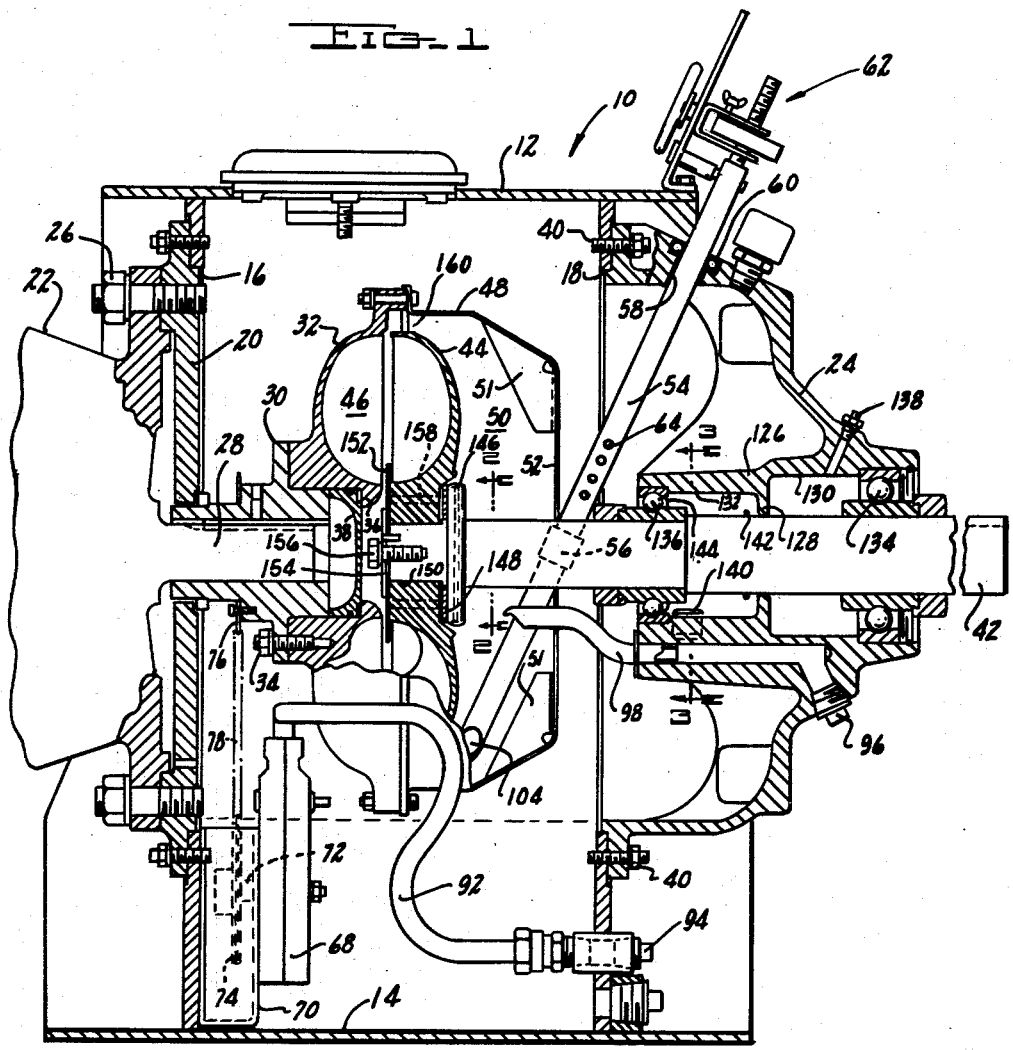
FIGURE 1 is a longitudinal section through an embodiment of the present invention using an electric motor as the source of input power.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

Referring now to the drawings, a more detailed description of the invention will be given. The fluid torque transmitter or coupling 10 is an enclosed, self-contained fluid drive unit. It includes a housing 12 which has a working fluid reservoir 14 and acts as an enclosure for the rotors, bearings, fluid circulating pump, and scoop tube, which parts will be described hereinafter.

The housing 12 has openings 16 and 18 at opposite ends which are closed at opening 16 in the embodiment of FIGURE 1 by the motor mounting face 20 for the electric motor 22, and at opening 18 by the end bell 24. As will be explained later, the mounting face 20 and motor 22 may be replaced by an end bell similar to end bell 24 for closing the opening 16, and a drive belt, flexible coupling, or the like may then be used for turning the input shaft.

The motor mounting face 20 is secured to the housing 12 by means of the plurality of nuts and studs 26. Extending into the interior of the housing is the input shaft 28 on which is keyed the input hub 30. The latter has a vaned impeller 32 secured thereto by a plurality of studs and nuts 34. The inner periphery of the impeller 32 has a shoulder 36 for cooperating with the input hub in retaining the fluid sealing member 38 in place, thereby preventing leakage of working fluid along input shaft 28.

The end bell 24 is attached to the other end of the housing 12 by means of the plurality of studs and nuts 40. Extending axially through the end bell 24 is the output shaft 42 which has mounted on its inner end the vaned runner 44. The latter is oppositely disposed from the impeller 32 and in juxtaposition to form therewith a working chamber 46 whereby a fluid coupling can be made between input shaft 28 and output shaft 42.

Connected to the outer periphery of the impeller 32 is a casing 48 which extends axially toward the output end and converges toward the output shaft 42 to enclose the runner 44 and form a scoop chamber 50. A series of radial vanes 51 are formed around the periphery of scoop chamber for aiding in pumping working fluid from scoop chamber 50 to work chamber 46 when load conditions require such transfer. The casing 48 terminates short of output shaft 42, leaving an opening 52 for introducing a scoop tube 54 into scoop chamber 50. The scoop tube 54 is supported for axial movement by the support bracket 56 attached to stationary end bell 24. An opening 58 in end bell with a seal 60 therein permits the scoop tube to extend outside the housing 12 where control means 62 determines the extent to which the scoop tube 54 enters the scoop chamber 50 and thereby regulates the amount of working fluid in scoop chamber 50. This in turn controls the amount of working fluid in the work chamber 46, and hence, the rate of speed and torque output of the output shaft 42.

Working fluid removed from the scoop chamber 50 by the scoop tube 54 is discharged from the latter through the series of axially arranged ports 64 resulting in such discharged working fluid being collected in the reservoir 14. The normal level of the working fluid in the reservoir 14 will be in the vicinity of the line 66, FIGURE 1. The working fluid is returned to the scoop chamber 50 and work chamber 46 by means of the reversible turbine-type rotary pump 68 which is partially submerged in the working fluid contained in reservoir 14.

The casing of pump 68 is secured to the side of the pan 70 which is attached to the end wall of housing 12. The pump shaft 72 extends into the pan 70 and has a sprocket 74 attached thereto. This sprocket 74 is in vertical alignment with another sprocket 76 mounted on the input hub 30. A chain 78 connects the two sprockets 74 and 76 to form a chain drive between the input shaft 28 and the pump shaft 72 so that the latter will turn in the same direction as the former.

The pump 68 is designed to pump working liquid irrespective of the direction of rotation of pump shaft 72. Referring to FIGURES 4 and 5, it can be seen that the pump impeller has radial vanes 78 on both faces. The casing has a suction inlet 80 at the bottom and a discharge outlet 82 at the top. Both sides of the casing have an annular channel 84 opposite the vanes 78 providing a passageway for working fluid to flow from the inlet 80 to the outlet 82. Because much of the working fluid would continue to circulate in the channels 84, a pair of baffles 86 are secured transversely of the channels and under the center of the outlet 82. By virtue of this arrangement the working fluid whether flowing clockwise or counterclockwise in the channels 84 can only flow as far as outlet 82 because the baffles 86 will not allow such working fluid to pass and instead will direct the same through the outlet 82.

Similarly a flipper valve 88 mounted on pin 90 prevents working fluid from recycling about the outer periphery of the pump casing. Thus, when the pump impeller turns clockwise the flipper valve will automatically turn in a clockwise direction preventing return of fluid and requiring all the fluid to pass out the discharge outlet 82. In the same manner the flipper valve will move to the opposite side by a counterclockwise movement when the impeller turns counterclockwise.

Thus, the pump will always discharge through outlet 82 irrespective of direction of rotation of the input shaft 28. Furthermore, because of the symmetrical arrangement of the pump 68, the pump characteristics will be the same irrespective of the direction of rotation of the pump.

The working fluid discharged from pump 68 will flow through the conduit 92 out of the housing 12 at 94. From this point the working fluid can pass through a cooler (not shown) and then back to inlet 96 in the output end bell 24, or if the cooler is not required, it may be bypassed, and the working fluid can flow through a conduit (not shown) connecting outlet 94 and inlet 96. The working fluid then flows through the conduit 98 which extends into the opening 52 in the scoop chamber 50 where such working fluid is discharged.

From the foregoing it can be seen that the input shaft can turn in either direction and the working fluid will be returned from the reservoir 14 to the scoop chamber 50 in substantially the same manner. The scoop tube 54 and its controls are also designed to function equally well, irrespective of the direction of rotation of the input shaft 28. Thus, referring to FIGURE 6, it should be understood that the lip 100 is slightly longer than lip 102 and that the mouths 104 and 106 are diametrically opposed from one another and are divided by a membrane 107 to provide two oppositely disposed scoops. The lip 100 is slightly longer than lip 102 because the scoop tube 52 does not enter scoop chamber 50 on the axis, but is offset so as to clear output shaft 42. For this reason the lip 100 must be slightly longer so that both lips will be the same distance from the periphery of scoop chamber 50, thereby assuring that the scoop tube 54 when set in one position will maintain the same dimensioned rotating ring of working fluid in chamber 50 irrespective of the direction of rotation of chamber 50.

The controls for the scoop tube 54 also will operate equally satisfactorily when the torque transmitter 10 is turning in one direction as when turning in the other direction. Furthermore, the controls can be either manual or automatic in operation. In the embodiment of FIGURE 1, a manual control is illustrated which is shown in greater detail in FIGURE 7.

As shown, the scoop tube 54 has a threaded end portion 108, an arm 110, which extends parallel to the threaded portion 108 and has a slot 112 extending axially through most of its length, is bolted to the top of the housing 12. A pin 114 is fastened to scoop tube 54 and passes through the slot 112, permitting axial movement but not rotational movement of scoop tube 54.

A yoke 116 has its arms apertured and fitted over the threaded portion 108 and a wheel 118 is positioned between the arm and is screwed on the threaded portion 108. The midpoint of the yoke has a stud 120 welded thereto and extending through the slot 112 in arm 110. A clamp nut 122 is threaded on the stud 120 so that when the nut 122 is run in tight, the scoop tube will be locked in place, but when the nut 122 is loose, the scoop tube 54 can move axially the length of slot 112.

A vernier control is provided by the wheel 118. The latter is narrower than the spacing of the arms of the yoke 118. Thus, when the clamp nut 122 is screwed in tight, limited axial movement of the scoop tube 54 can be obtained by turning wheel 118. A wing lock screw 124 is provided for securing the vernier wheel 118 against rotation.

Thus, it can be seen that the scoop tube 54 and its controls function equally well regardless of the direction of rotation of the torque transmitter. The mouths 104 and 106 of the scoop tube 54 operate to remove and control the working fluid in the scoop chamber 50 equally well and the scoop tube 54 is moved axially to change the speed of the output shaft 42 so that such movement affects the scoop tube 54 and its functioning the same whichever direction the torque transmitter 10 is turning.

Referring again to FIGURE 1, the manner in which the output shaft 42 is suspended will be explained. The end bell 24 has a hollow hub portion 126 which is radially spaced from the shaft 42. An inwardly projecting rib 128 divides the hollow hub portion into two separate lubricating pockets 130 and 132 for the outer and inner antifriction ball bearings 134 and 136. The pocket 130 is adapted to receive grease through the grease fitting 138. The inner bearing 136 is adapted to be lubricated by the working fluid and the pocket 132 will retain a limited amount of such fluid which is accumulated therein by splash or spray feed. In order to prevent such fluid from entering the grease pocket a drain port 140 extends from the interior of the housing to the pocket at a point above the lowest part of the pocket, but below the rib 128. An O ring 142 fits on the shaft 42 to prevent fluid from traveling down the shaft from pocket 132 to pocket 130. Also, a seal ring 144 is positioned on the bearing 136 to prevent excess fluid from flowing into said bearing.

From the foregoing it can be seen that the output shaft 42 is suspended on two axially spaced bearings 134 and 136 which are carried in the end bell 24. Thus, it is completely independent from input shaft 28 except for the fact that both are suspended from housing 12. While the shaft 28 is shown to be a part of electric motor 22, it will be understood from the description following hereinafter that an end bell similar to end bell 24 can be secured to housing 12 at the input end and the input shaft 28 will then be suspended from two bearings in a similar manner to output shaft 42.

The manner in which the runner 44 is mounted in spaced relation to the impeller 32 and independent from the input shaft 28 can be seen best in FIGURES 1 and 2. A pin 146 extends through the output shaft 42. An annular deflector plate 148 having a V-notch for fitting the pin 146 is disposed over shaft 42. The latter has a reduced diameter end portion 150 on which is fitted the hub of runner 44. A load plate 152 and retainer plate 154 are then held in place by bolt 156. The sub of runner 44 has a plurality of apertures 158 which act as breather holes for the work chamber 46 and through which working fluid may be discharged into the scoop chamber 50. The deflector plate 148 then serves to direct such working fluid radially outwardly for return to the working chamber 46 through the passageway 160 between casing 48 and runner 44. The vanes 51, previously described, perform a similar function of directing working fluid from the ring of fluid that will normally be present in scoop chamber 50 into the passageway 160 and work chamber 46. This is a particularly beneficial feature of the present invention because it enables the torque transmitter to have high load starting torque characteristics.

As previously pointed out, the present invention can be used either as a unit being driven from a belt drive or as a unit having an electric motor as the source of power. Such latter an arrangement has been described above and the front elevation in FIGURE 8 shows the general contours thereof. The torque transmitter can also be arranged with end bells at both ends and such an arrangement can be seen in FIGURE 9 wherein the input end bell 162 has replaced the motor 22.

Furthermore, when desired an automatic control for moving the scoop tube 54 may be employed. Such an arrangement can be seen in FIGURE 8 wherein the bell crank lever 164 has one end attached to the scoop tube 54a and the other end is adapted to be connected to a governor or other speed control device.

EXTENDED SCOPE OF INVENTION

Figure 10:
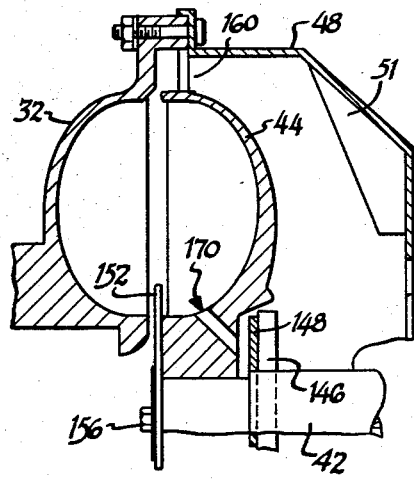
FIGURE 10 is a fragmentary longitudinal sectional view, showing a second form of breather passage for use in the invention.

Modification of FIGURE 10

It is to be included within the scope of the invention to position the breather holes 158, as shown in FIGURE 1, higher up in the runner shell 44, but outside of the full load liquid level of the working chamber.

Accordingly, as shown in FIGURE 10, a plurality of canted breather holes 170 are formed through the impeller shell 44 upstream of the load plate 152. It will be noted that the breather holes 170 have a semi-axial radial orientation and pass through the runner shell 44 from an inlet point on the inside to an exhaust point on the backside of the runner shell behind the annular deflector plate 148. It will also be noted that the breather holes 170 have their inlet points positioned above or outside of the full load liquid level of the working circuit; thus, no fluid is exhausted during the normal operation of the unit.

However, when the runner encounters overload, the fluid vortex is expanded radially inwardly against centrifugal forces, by the violent pumping action produced when the impeller overspeeds the runner, and the working liquid impinges against the load plate 152 with substantial force. This causes the liquid to pile up behind the load plate 152 and due to the immediate presence of breather holes 170 at that point, the overload liquid is quickly and positively exhausted from the working chamber, to provide rapid response overload declutching.

As regards the semi-axial radial orientation of the breather holes 170 of FIGURE 10, it is to be included within the scope of the invention to so orient the breather holes that the streams of exhausting liquid will avoid hitting the opening 52 of scoop chamber casing member 48. By so operating it may be desirable in some instances for improved economy of manufacture to omit the deflector plate 148 and retaining pin 146.

With the deflector plate 148 omitted, overload declutching liquid will exhaust from the working chamber directly and positively into the scoop chamber 50 without frictional forces provided by an intervening baffle. Thus, the declutch action will be even more rapid and smooth and the declutch liquid will be directed to impinge against vanes 51 for immediate return to the working chamber via annular passage 160; thus, quick pick-up torque resumption will be provided when the overload condition has been passed.

Figure 11:
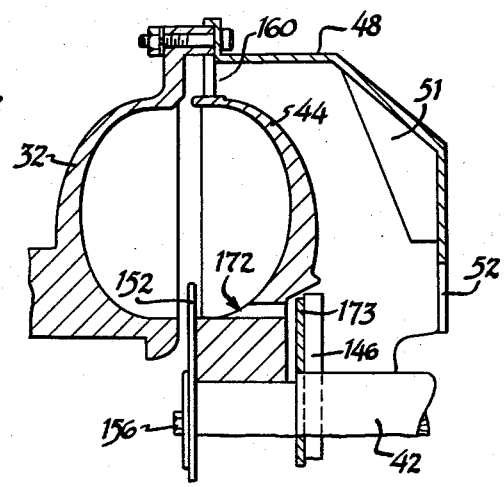
FIGURE 11 is a fragmentary longitudinal section view, showing a third form of breather passage for use in the invention.

Modification of FIGURE 11

It is also to be included within the scope of the present invention to position the breather holes 172 upstream of load plate 152, but oriented parallel to the axis of the coupling as shown in FIGURE 11. In this embodiment of the invention, it will be desirable to increase the diameter of the deflector plate as shown at 173 to divert the exhausting liquid radially in the scoop chamber.

In this modification of the invention, the working liquid is rapidly exhausted from the work chamber as described in connection with FIGURE 10; thus providing a very rapid response overload declutching action.

Figure 12:
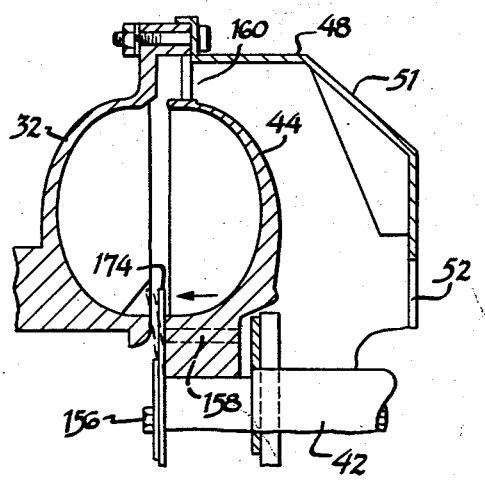
FIGURE 12 is a fragmentary longitudinal section view, showing a flexible load ring for use with the axially aligned breather holes of the type employed in FIGURE 1.

Modified load plate of FIGURE 12

As shown in FIGURE 12, it is also to be included within the scope of the invention to fabricate the load plate 174 as a flexible member, of steel, plastic or suitable material. In this modification of the invention, there are no holes in the load plate 174 to match the breather holes 178, as in FIGURE 1; instead, the flexible nature of the plate 174 permits it to flex by overload liquid pressure against the upstream side and act as a flapper valve for breather holes 158. As indicated in FIGURE 12, flexing will be between the solid and dotted outline positions, the solid outline position being assumed during normal operation.

During overload conditions, however, pressure against the upstream side of the plate 174 causes flexure or movement to the dotted outline position; opening of breather holes 158; and thus an appropriate degree of declutching of the unit by permitting flow along the upstream side of plate 174 and into the passages 158 for exhaust. However, as quickly as the overload condition is passed, the flexed plate will immediately return to the solid outline position to close the holes 158 and prevent further exhaust, with concomitant torque resumption of the unit.

Thus, a very effective valving action for the breather holes 158 is provided, which is of a controllable nature, determined by the flex resistance built into the load plate 174. Thus, the declutch operation can be set in accordance with maximum stress conditions to be tolerated by the unit.

Figure 13:
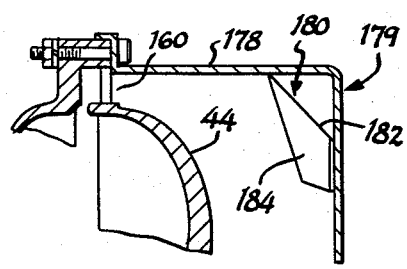
FIGURE 13 is a fragmentary longitudinal section view of a modified form of scoop tube casing, employing wedge-shaped impeller vane assemblies.

*FIGURE 13—Modified configuration of scoop chamber shell and scoop chamber impeller vanes*

As shown in FIGURE 13, it may be desirable in some instances to fabricate the scoop chamber casing 178 with a square corner as at 179; thus without inclination, as distinguished from the corresponding unit 48 of FIGURES 1–12, which has a sloping corner. In the FIGURE 13 modification of the invention, wedge-shaped vanes 180 are employed which fit into the corner 179, and such vanes carry slanted false bottom elements 182 that cooperate with radially extending fin-like projections 184. Thus, the fins 184 and slanted bottom elements 182 work together to impel the scoop chamber liquid back into the work chamber via the annular passage 160.

ADVANTAGES OF THE PRESENT INVENTION

From the foregoing, it will be understood that a completely reversible, variable speed liquid coupling has been provided for the advancement of the art. The unit is characterized by improved simplicity; with fewer moving parts than comparative units, yet providing equivalent or improved results.

This fluid drive is the first known variable speed design to attain completely adequate torque transmittal without using an inner casing or primary rotating member shrouding the runner back wall. As will be noted from the foregoing description, advantage is taken of the back wall of the runner to form one wall of the scoop chamber, remaining functional elements being so coordinated therewith as to obtain torque transmittal characteristics commensurate with more complicated prior art units. Heretofore it has been established as a substantial requisite to adequate torque transmittal that a primary rotating member be positioned in surrounding relationship to the runner back wall. Accordingly the present invention presents a substantial advancement in the art.

Also, from the foregoing, it will be noted that the oil deflector plate 148 is carried on the output or runner shaft by means of a through pin 146 for clean design and improved return of exhausted liquid back to the work chamber.

Further, the present invention utilizes a dual tipped scoop tube with a dividing membrane of improved operating efficiency and lower force requirement to penetrate the rotating ring of liquid in the scoop chamber.

Still further, an advantage of the present invention is that the unit has high load starting torque characteristics due to the unique arrangement of oil, fill vanes and oil deflector plate.

Because of the inherent high torque capacity of this unit, it is possible to maintain a constant output speed in the face of varying loads and varying input speeds, simply by adjustments of the position of the scoop tube.

Having thus described our invention, we claim:
1. In a fluid coupling,
a toroidal work chamber defined by opposed impeller and runner shells having inner and outer peripheries, said shells being axially spaced to define a radial gap for flow of liquid to and from said work chamber,
a casing connected to said impeller shell and enclosing said runner shell in spaced relation to form one wall of a rotatable scoop chamber and the back of the runner forming the other wall of said scoop chamber,
said casing defining an open annular eye coaxial to and spaced from said work chamber,
said scoop chamber being coaxial to and in free liquid communication with said work chamber via said radical gap whereby the level of liquid in said scoop chamber determines the amount of liquid in said work chamber and the slip in said coupling,
means for supplying liquid to said scoop chamber,
a scoop tube adjustable in said scoop chamber by radial movement through said annular eye to control the amount of liquid therein,
at least one breather hole through said runner and extending in free liquid communication from said work chamber to said scoop chamber toward said eye,
deflector means on the runner shell interior adjacent to said breather hole for deflecting liquid into said hole, said deflector means and breather hole being positioned outside the full load level of said work chamber and adjacent said inner periphery of said runner,
baffle means at the scoop chamber end of said breather hole for deflecting liquid discharged through said hole radially in said scoop chamber and away from said eye,
and vane means on the interior of said casing and rotatable therewith to smoothly rotate liquid within said scoop chamber for flow into said work chamber via said radial gap,
and means for recycling liquid discharged by said scoop tube back to said supply means.
2. In a fluid coupling, a toroidal work chamber defined by opposed impeller and runner shells having inner and outer peripheries and separated by a radial gap, means for supplying fluid to said work chamber, a casing connected to said impeller shell and enclosing said runner shell in spaced relation, a rotatable scoop chamber defined by said casing as one wall with the back of the runner shell forming the other wall of said scoop chamber, said scoop chamber being coaxial to said work chamber and in free liquid communication with said work chamber whereby the level of liquid in said scoop chamber determines the amount of liquid in said work chamber and the slip in said coupling, said casing having an opening therein coaxial to and spaced from the back of the runner shell, a scoop tube extending through said opening and adjustable in said scoop chamber by radial movement through said opening for controlling the amount of liquid therein and thus in said work chamber, said runner shell including a hub, said runner hub having at least one breather hole formed therethrough and in free liquid communication with said work chamber, said breather hole extending from the inner periphery of the runner hub to said scoop chamber, the outlet of said breather hole being directed toward the opening in said casing, baffle means at the outlet of said breather hole for deflecting liquid discharged through said breather hole radially in said scoop chamber, vane means on the interior of said casing and rotatabe therewith to smoothly rotate liquid within said scoop chamber for flow into said work chamber via said radial gap, and a flexible load plate connected to the inner periphery of said runner hub in overlying relation to said breather hole, a portion of said load plate extending into the work chamber so that the toroidal flow of fluid thereagainst will cause flexure thereof to expose said breather hole and deflect liquid thereinto for exhaust of liquid from said work chamber into said scoop chamber.

3. In a fluid coupling, a toroidal work chamber defined by opposed impeller and runner shells, said shells being axially spaced to define a radial gap for flow of liquid to and from said work chamber, a casing connected to said impeller shell and enclosing said runner shell in spaced relation to form one wall of a rotatable scoop chamber with said runner shell forming the other wall of said scoop chamber, said scoop chamber being coaxial to and in free liquid communication with said work chamber via said radial gap whereby the level of liquid in said scoop chamber determines the amount of liquid in said work chamber and the slip in said coupling, means for supplying liquid to said scoop chamber, said casing defining an open annular eye coaxial to and spaced from said work chamber, a scoop tube extending through said annular eye into the scoop chamber and adjustable in said scoop chamber to control the amount of liquid therein, at least one breather hole through said runner shell extending in free liquid communication from said work chamber to said scoop chamber towards said eye, deflector means on the interior of the runner shell adjacent to said breather hole for deflecting liquid into said breather hole, said breather hole and deflector means being positioned outside the full load level of said work chamber and adjacent the inner periphery of the runner shell, baffle means at the scoop chamber end of said breather hole for deflecting liquid discharged through said hole radially outwardly in said scoop chamber and away from said eye, said casing having an inner profile slanting outwardly towards said radial gap to direct fluid into said gap under centrifugal force, vane means on the interior of said slanting profile and rotatable therewith to smoothly rotate liquid with said scoop chamber for flow into said work chamber via said radial gap, and means for recycling liquid discharged by said scoop tube back to said supply means.

References Cited by the Examiner
UNITED STATES PATENTS

| | | | |
|---|---|---|---|
| 1,859,607 | 5/32 | Sinclair | 60—54 |
| 2,187,656 | 1/40 | Kiep et al. | 60—54 |
| 2,224,884 | 12/40 | Schneider et al. | |
| 2,491,483 | 12/40 | Dolza et al. | 60—54 |
| 2,627,166 | 2/53 | Becker | 60—54 |
| 2,627,167 | 2/53 | Becker | 60—54 |
| 2,664,705 | 1/54 | Becker | 60—54 |
| 2,723,530 | 11/55 | O'Leary | 60—54 |
| 2,784,555 | 3/57 | Anderson | 60—54 |
| 3,037,459 | 6/62 | Nelden | 60—54 XR |

FOREIGN PATENTS

| | | |
|---|---|---|
| 446,530 | 4/36 | Great Britain. |
| 491,977 | 9/38 | Great Britain. |
| 692,286 | 6/53 | Great Britain. |

JULIUS E. WEST, *Primary Examiner.*